(12) United States Patent
Shirota

(10) Patent No.: US 6,567,222 B2
(45) Date of Patent: May 20, 2003

(54) LENS BARREL FOR USE IN ZOOM LENS APPARATUS

(75) Inventor: Kei Shirota, Saitama (JP)

(73) Assignee: Fuji Photo Optical Co., Ltd. (JP)

( * ) Notice: Subject to any disclaimer, the term of this patent is extended or adjusted under 35 U.S.C. 154(b) by 0 days.

(21) Appl. No.: 10/067,469

(22) Filed: Feb. 4, 2002

(65) Prior Publication Data
US 2002/0118468 A1 Aug. 29, 2002

(30) Foreign Application Priority Data
Feb. 5, 2001 (JP) .......................... 2001-027843

(51) Int. Cl.[7] .............................................. G02B 15/14
(52) U.S. Cl. ........................ 359/699; 359/700; 359/701
(58) Field of Search ................................. 359/699, 700, 359/701, 703, 704, 823

(56) References Cited

U.S. PATENT DOCUMENTS 5,886,836 A * 3/1999 Sasaki et al. ............... 359/823
6,097,548 A * 8/2000 Funahashi et al. .......... 359/694
6,195,211 B1 * 2/2001 Iwasaki ...................... 359/694

* cited by examiner

Primary Examiner—Ricky Mack
(74) Attorney, Agent, or Firm—Price, Heneveld, Cooper, DeWitt & Litton (57) ABSTRACT

A lens barrel for use in a zoom lens apparatus to address the needs of optical devices such as a liquid crystal projector equipped with higher magnification and higher accuracy is provided. That is, the lens barrel of the present invention includes: supporting projections provided on the outer periphery of a fixed barrel projecting therefrom to support a cam barrel in contact therewith in a small area for ensuring smooth rotation of the cam barrel; and alignment guides formed in the fixed barrel and the cam barrel to fit the cam barrel into the fixed barrel keeping a predetermined positional relationship therebetween, thereby enabling the operation for adjusting the position of transmission of light having passed through a liquid crystal panel within a projection lens to be performed without any trouble.

14 Claims, 10 Drawing Sheets

LENS BARREL FOR USE IN ZOOM LENS APPARATUS

BACKGROUND OF THE INVENTION

1. Field of the Invention

The present invention relates to a zoom lens apparatus for use in a liquid crystal projector, a television camera for industrial use or the like, more particularly, to a lens barrel for use in a zoom lens apparatus.

2. Description of the Related Art

A typical zoom lens apparatus employed in a liquid crystal projector, a television camera for industrial use or the like is constructed so that a cam barrel is freely fitted into a fixed barrel. The fixed barrel holds a lens system such as a zooming lens. The cam barrel is made to rotate around an optical axis to move the lens system in a direction parallel to the optical axis (hereinafter "the optical axis direction"). That is, guide holes consisting of an elongated hole extending parallel to the optical axis are formed in the fixed barrel and support pins are provided on the outer periphery of a lens mount that holds the lens system while projecting into the guide holes. Further, elongated holes constituting cams are provided in the cam barrel along a direction tilted appropriately relative to the optical axis direction. Still further, the support pins are freely inserted into the cams. This construction allows the lens system to move in the optical axis direction guided by the guide holes while being limited in its moving distance by the oblique orientation of the cams.

In recent years, there has been a strong demand for an optical device such as a liquid crystal projector provided with highly sophisticated optical performances. That is, the liquid crystal projector is required to project images clearly onto a screen even when the amount of light emitted from a light source incorporated therein is small. For this reason, in such a liquid crystal projector, it is required that a lens having a small F value is employed in the optical system. In addition, the optical system is required to increase its magnification ratio so as to be able to project an image of copy filled with small characters in clear detail. Such strong demand for highly sophisticated optical performances to be realized in the optical system may cause the following problems in the conventional lens barrel for use in a zoom lens apparatus.

In the conventional lens barrel, to ensure advantages, such as simplicity of assembling operation, ease of operation for adjusting each part, continuing resistance to thermal deformation and the like, an appropriate gap as an allowance between parts is intentionally provided (when needed) or the number of parts to be employed is reduced by reducing the number of connecting parts provided between the parts. However, even such a microscopic event that a negligible gap causes the positional distortion of the lens in the optical axis direction may adversely affect the optical performance, thereby possibly disturbing realization of highly sophisticated optical performance to be achieved in an optical device.

SUMMARY OF THE INVENTION

In consideration of the above-described problems, the present invention has been conceived. That is, an aspect of the present invention is to provide a lens barrel for use in a zoom lens apparatus to securely be able to address the needs for developing optical devices with highly sophisticated optical performance.

A lens barrel for use in a zoom lens apparatus according to the present invention comprises: a fixed barrel holding a zoom lens system, and a cam barrel freely fitted to the fixed barrel and made to rotate around an optical axis direction as an axis with respect to the fixed barrel to move the zoom lens system in the optical axis direction, in which the fixed barrel is further constructed such that an appropriate number of radial supporting projection constituting a part of an outer periphery of the fixed barrel and projecting an appropriate length in both a circumferential direction of the fixed barrel and the optical axis direction are provided on portions of the fixed barrel, the portions being located in correspondence with ends of the cam barrel while facing the associated ends thereof, and the cam barrel is supported by the supporting projections.

As the cam barrel is supported by the supporting projections, the area where the cam barrel and the fixed barrel are in contact with each other can be made small to the utmost. Therefore, the cam barrel can be made to rotate smoothly with respect to the fixed barrel.

In general, it is desirable that a zoom lens apparatus is assembled in small size and is light in weight, and further can be provided at a low price. For this reason, it is required that the fixed barrel be formed by injection molding or the like using a synthetic resin and the cam barrel be formed by processing and molding a metal such as aluminum. Note that in the case where both the fixed barrel and the cam barrel are made of a metal, manufacturing cost of a zoom lens apparatus is forced to increase, and in the case where they both are made of a synthetic resin, there possibly arises a problem that accuracy with which a zoom lens system operates in response to the rotational movement of the cam barrel varies, whereby the zoom lens apparatus cannot maintain its desired accuracy.

In the case where the fixed barrel is formed by molding a synthetic resin and the cam barrel is formed by molding a metal, as those materials have their respective coefficients of thermal expansion different from each other, there possibly arises a problem that when the fixed barrel is thermally deformed, the cam barrel cannot be rotated smoothly. In addition, in the case where the area where the fixed barrel and the cam barrel are in contact with each other is large, possibility of causing the above-described problem increases. Specifically, in such an optical device as a liquid crystal projector, as a light source generating heat is disposed next to the zoom lens apparatus, the lens barrel is easily affected by the heat. In order to address such a serious problem, as shown in the lens barrel of the present invention, the fixed barrel is formed to have supporting projections thereon such that the supporting projections are made in contact with the inner periphery of the cam barrel for guiding the cam barrel into rotational movement, thereby enabling the cam barrel to rotate smoothly to the utmost even in a state of the fixed barrel being thermally deformed.

Furthermore, the lens barrel for use in a zoom apparatus in accordance with the present invention is constructed such that the supporting projections are provided on respective ends of the fixed barrel and spaced at equal intervals, and further, the supporting projections on the respective ends of the fixed barrel are provided facing each other.

In the case where the fixed barrel is processed by using a synthetic resin, as the supporting projections on front and rear ends of the fixed barrel are provided facing each other, operation for designing a molding die assembly becomes easier.

Additionally, the lens barrel for use in a zoom lens apparatus in accordance with the present invention is constructed such that the supporting projections are provided on respective ends of the fixed barrel and spaced at equal intervals, and further, the supporting projections are alternately disposed at front and rear ends of the fixed barrel in the circumferential direction thereof.

In the event the fixed barrel is thermally deformed, the construction that the supporting projections are alternately disposed at front and rear ends of the fixed barrel in the circumferential direction thereof makes it possible to permit the deformation to equally act on the cam barrel, thereby enabling the cam barrel to maintain its smooth rotation to the utmost.

Additionally, a lens barrel for use in a zoom lens apparatus in accordance with another aspect of the present invention comprises: a fixed barrel holding a zoom lens system and at the same time, a focus lens system in a front end thereof; a cam barrel freely fitted to the fixed barrel and made to rotate around an optical axis direction as an axis with respect to the fixed barrel to move the zoom lens system in the optical axis direction; and an input member fixed to the cam barrel to rotate the cam barrel, in which the cam barrel comprises a control section formed on an outer periphery of the cam barrel for restricting movement of the input member in the optical axis direction to thereby limit the degree of longitudinal engagement of the input member with the cam barrel.

In order to enhance compactness of a zoom lens apparatus, the zoom lens apparatus is often designed so that a part of one component and a part of another component, both components being attached to a projection lens barrel, are made to overlap each other in the optical axis direction. In the case where a focus lens system is held at the front end of a fixed barrel, a part of a drive member of the focus lens system and a part of an input member of a zoom lens system are made to overlap each other in the optical axis direction. Those members are formed annular, and further, the inner annular member is to be attached to a lens barrel such as a cam barrel at the portion thereof where those members are overlapped with each other. Therefore, once the outer annular member is attached to the lens barrel in advance, the phenomenon that the inner annular member cannot be attached thereto may occur. In such a case, when the assembling of the outer annular member is finished, the outer annular member is being attached to locate outside the surface area that the inner annular member will occupy when attached to the associated position. Thus, after the inner annular member is attached to the associated position, the outer annular member is made to move to the position to be attached and then attached thereto while being fixed thereto.

That is, in the case where the input member is the outer annular member and a drive member holding the focus lens system is the inner annular member, the input member is made to fit into the cam barrel while being located outside the surface area that the drive member will occupy when attached to the associated position. In this case, the input member will later on be moved back sliding on the cam barrel to the position to be attached. The moving range needed for the input member to move to the position located outside the surface area that the drive member will occupy when attached to the associated position is limited by the control section to prevent the input member from moving beyond the moving range, thereby enabling the operation for assembling the drive member and the input member to be simplified.

Furthermore, the lens barrel for use in a zoom lens apparatus in accordance with the present invention is con-
structed such that a moving speed of a processing tool is made different when the outer periphery of the cam barrel is processed, in such a manner that the moving speed thereof is made low to process one area of the outer periphery of the cam barrel ranging from a front end to an appropriate position of the cam barrel with high accuracy and the moving speed is made high to process the other area of the outer periphery of the cam barrel, whereby surface areas having different processing accuracies are formed on the outer periphery of the cam barrel and a boundary between the surface areas having different processing accuracies constitutes the control section.

In the case where the cam barrel is made of a metal and the outer periphery thereof is processed by a lathe, the outer periphery thereof is processed with high accuracy to have fine roughness thereon by making the moving speed of the cutting blade low, thereby forming a sliding surface thereon for the input member to be able to smoothly move on the sliding surface. On the other hand, the outer periphery thereof is also processed to be a roughened surface by making the moving speed of the cutting blade high. Therefore, a boundary between the sliding and roughened surfaces can be defined as the control section. That is, the input member can smoothly move on the outer periphery of the cam barrel since the outer periphery thereof at a front section thereof is processed to be a sliding surface. In addition, as the outer periphery thereof other than the sliding surface is formed to be a roughened surface, the input member cannot move on the roughened surface, thereby permitting the input member to move only within a range of surface area, the range being determined to include a surface area to a minimum that the drive member needs when attached to the associated position. Moreover, after the drive member is attached to the associated position, the input member can easily be moved to the position to be attached.

Additionally, the lens barrel for use in a zoom lens apparatus in accordance with the present invention is constructed such that an outer diameter of the cam barrel is made different at the boundary between the surface areas having different processing accuracies to prevent the input member from moving beyond a high accuracy area out of the surface areas, the high accuracy area being processed with high accuracy.

As the input member is fitted into the cam barrel having a gap with respect thereto, even in the case where the other surface area other than a surface area of the cam barrel is processed with high accuracy, i.e., a sliding surface is formed having a roughened surface, when an external force happens to be applied to the input member, the phenomenon that the input member falls into the state thereof being squeezed into the cam barrel at the position of the roughened surface thereof could occur. When the input member under such state is forcibly going to be moved to the position to be attached, the phenomenon that the input member is locked staying on the roughened surface by the frictional force generated therebetween. Therefore, non-movement may occur.

Accordingly, the construction that the outer diameter of the other surface area other than the sliding surface is made larger than that of the sliding surface prevents the input member from moving beyond the surface-area having the sliding surface.

Moreover, the lens barrel for use in a zoom lens apparatus in accordance with the present invention is constructed such that the fixed barrel is formed by molding using a synthetic resin and the cam barrel is formed by molding using a metal.

The construction that the fixed barrel is molded from a resin and the cam barrel is molded from a metal enables the zoom lens apparatus to drive a projector lens with high accuracy, i.e., in a manner that is free from damage to its optical performances. Further, increase in the manufacturing cost of the zoom lens apparatus is suppressed.

These and other features, advantages, and objects of the present invention will be further understood and appreciated by those skilled in the art by reference to the following specification, claims, and appended drawings.

BRIEF DESCRIPTION OF THE DRAWINGS

The above and other objects, features, and advantages of the present invention will be apparent from the following detailed description of the preferred embodiments of the invention in conjunction with the accompanying drawings, in which.

DETAILED DESCRIPTION OF THE PREFERRED EMBODIMENTS

A lens barrel for use in a zoom lens apparatus of the present invention will be explained in detail below in accordance with preferred embodiments with reference to the accompanying drawings.

Figure 1:
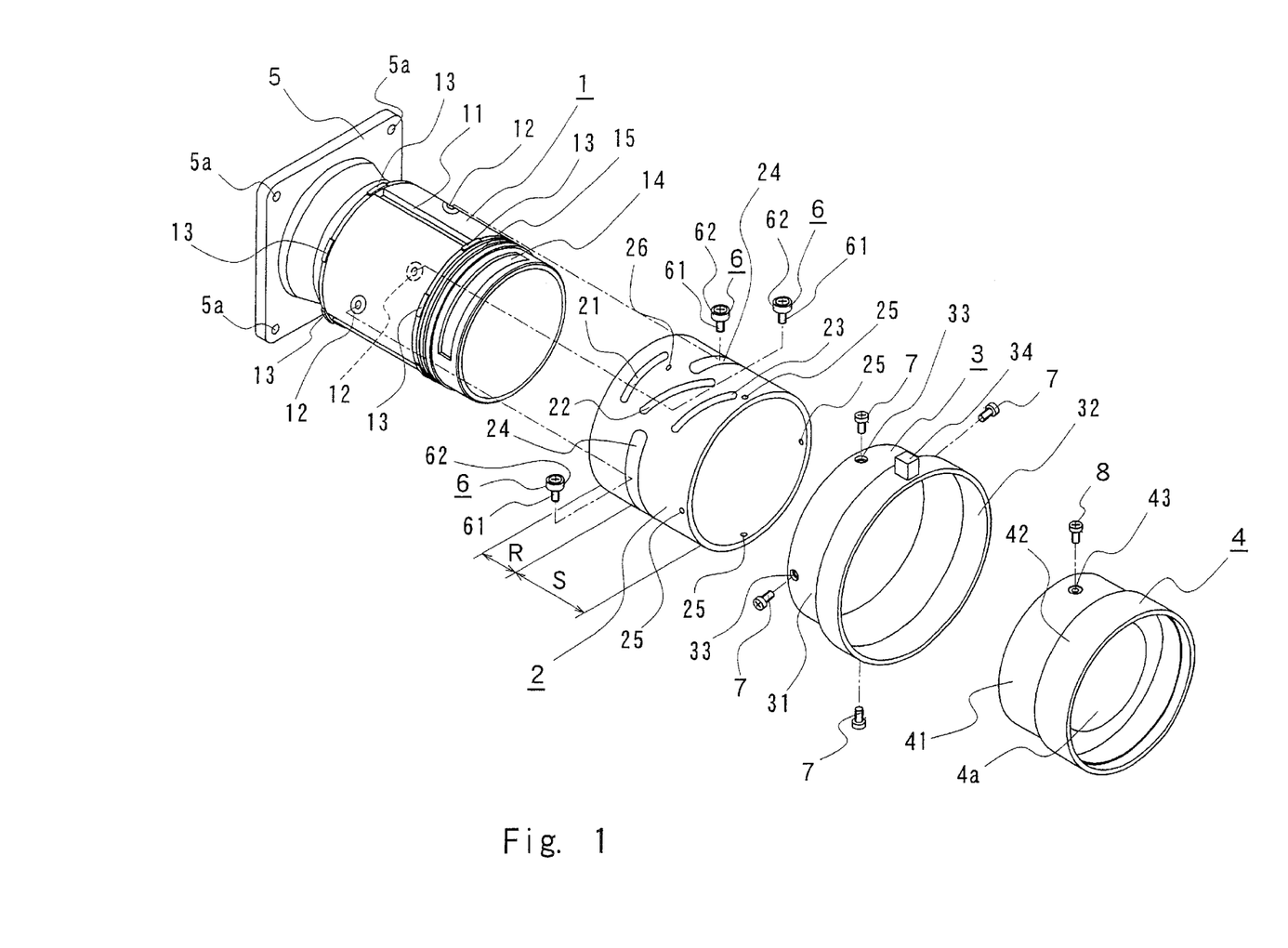
FIG. 1 is an exploded perspective view of a lens barrel for use in a zoom lens apparatus in accordance with the present invention.

FIG. 1 is an exploded perspective view of a lens barrel for use in the zoom lens apparatus illustrating an overall structure thereof. The lens barrel comprises a fixed barrel 1 fixed to a main body (not shown) of the zoom lens apparatus, a cam barrel 2 freely fitted onto the fixed barrel 1, a zooming ring 3 as an input member fixed to the front end of the cam barrel 2, and a focusing ring 4 supported on the front end of the fixed barrel 1.

On the rear end of the cylindrical fixed barrel 1 is provided an approximately rectangular base block 5. At four corners of the base block 5 are formed through-holes 5a where fixing screws penetrate to fix the base block to the main body of the zoom lens apparatus. In the fixed barrel 1 are formed three guide holes 11 each consisting of an elongated hole extending along the axial direction of the cylinder and equally spaced from each other. Furthermore, in three appropriate portions of the outer periphery thereof are formed female screw portions 12 spaced at equal intervals. The portion used for formation of the female screw portion 12 is formed having a large thickness to constitute a thick portion 1a.

In addition, on front and rear ends of the fixed barrel 1 are formed supporting projections 13 projecting in a radial pattern. The supporting projections 13 are constructed so that six projections are formed on each of the front and rear ends thereof and spaced at nearly equal intervals. Furthermore, the outer periphery of each of the supporting projections 13 is shaped like an arc centering around the axis of the fixed barrel 1 and has a diameter slightly larger than that of the outer periphery of the fixed barrel 1. Additionally, the supporting projections 13 at the front end thereof and the supporting projections 13 at the rear end thereof are disposed facing each other in the axial direction of the fixed barrel 1.

Moreover, a guide groove 14 consisting of a groove having an appropriate width and depth is formed in the front end of the fixed barrel 1 along a circumferential direction thereof. In addition, on the surface of the fixed barrel located on the rear side of the guide groove 14 is formed a male helicoid 15.

The zoom lens barrel in accordance with the embodiment, for instance, comprises a zoom lens system including three lens groups 2a, 2b, and 2c (refer to FIG. 4) movable in the optical axis direction and a focus lens system 4a provided at the front end of the fixed barrel 1 and movable in the optical axis direction to adjust focusing.

Figure 4:
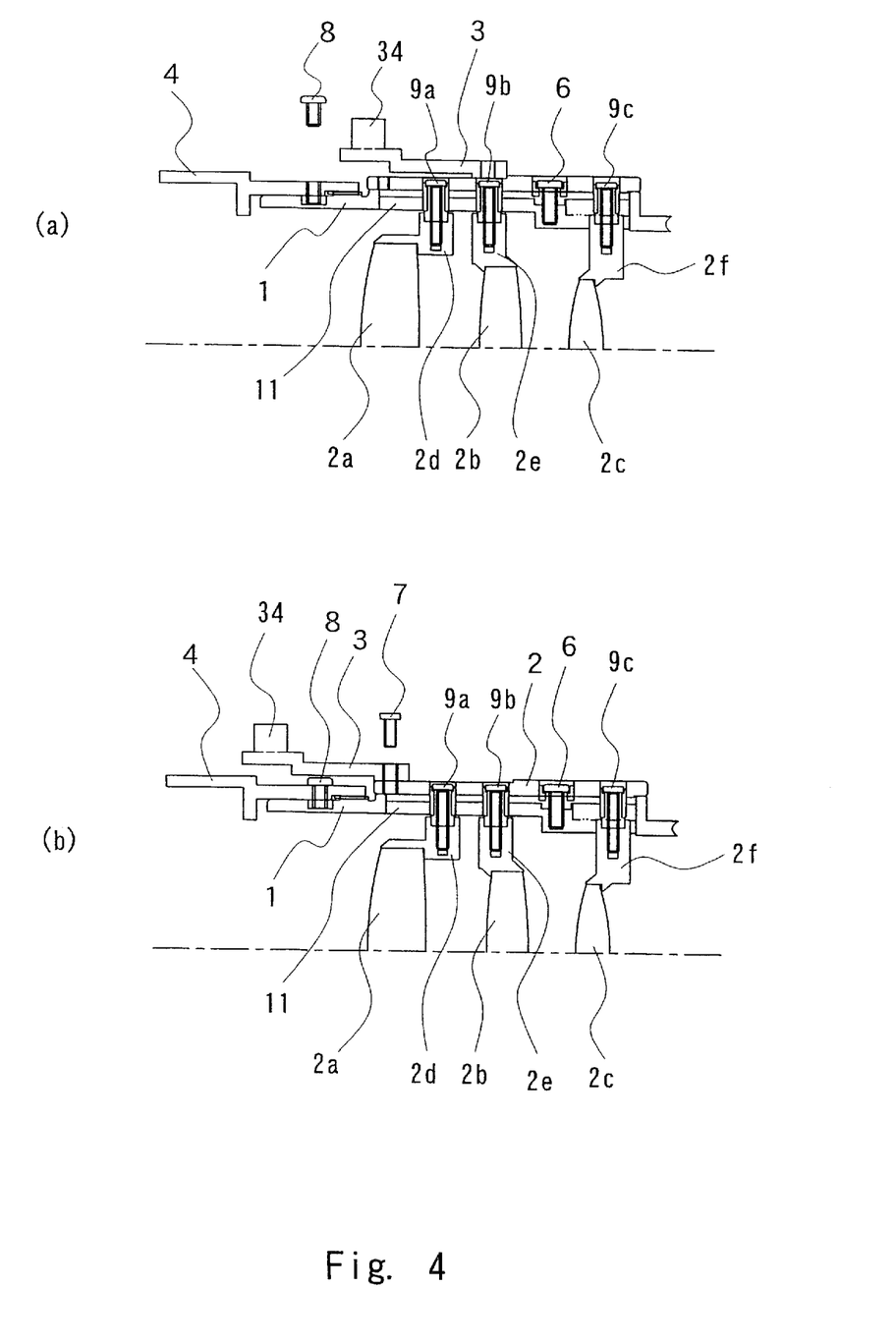
FIG. 4 is a cross-sectional view of a lens barrel for use in a zoom lens apparatus in accordance with the present invention, taken along a plane passing through the axis of the lens barrel.

Three sets of three cams 21, 22, and 23, each set of three cams consisting of an elongated hole having its longitudinal direction appropriately tilted with respect to the axial direction of the cam barrel 2 and being arranged alongside in the axial direction thereof, are formed in three portions of the cam barrel 2 in the circumferential direction thereof, the three portions being spaced at equal intervals in the circumferential direction thereof. The cams 21, 22, and 23 are formed to have respective tilted by angles different from one another and are connected with the respective lens groups 2a, 2b, and 2c, each of which individually constitutes the associated zoom lens system. That is, as shown in FIG. 4, the lens groups 2a, 2b, and 2c are held by lens mounts 2d, 2e, and 2f, respectively, and holding screws 9a, 9b, and 9c, which penetrate the cams 21, 22, and 23 and the guide holes 11 of the fixed barrel 1 from outside the cam barrel, are-tightened up into the lens mounts 2d, 2e, and 2f to connect the lens groups 2a, 2b, and 2c with the associated guide holes 11 and cams 21, 22, and 23.

Furthermore, control holes 24 consisting of an elongated hole having its longitudinal direction in the circumferential direction of the cam barrel 2 are formed in three portions thereof in the circumferential direction while being spaced at equal intervals. In addition, the cam barrel 2 is freely fitted into the fixed barrel 1 so that the control holes 24 are to be positioned in correspondence with the female screw portions 12.

Figure 3:
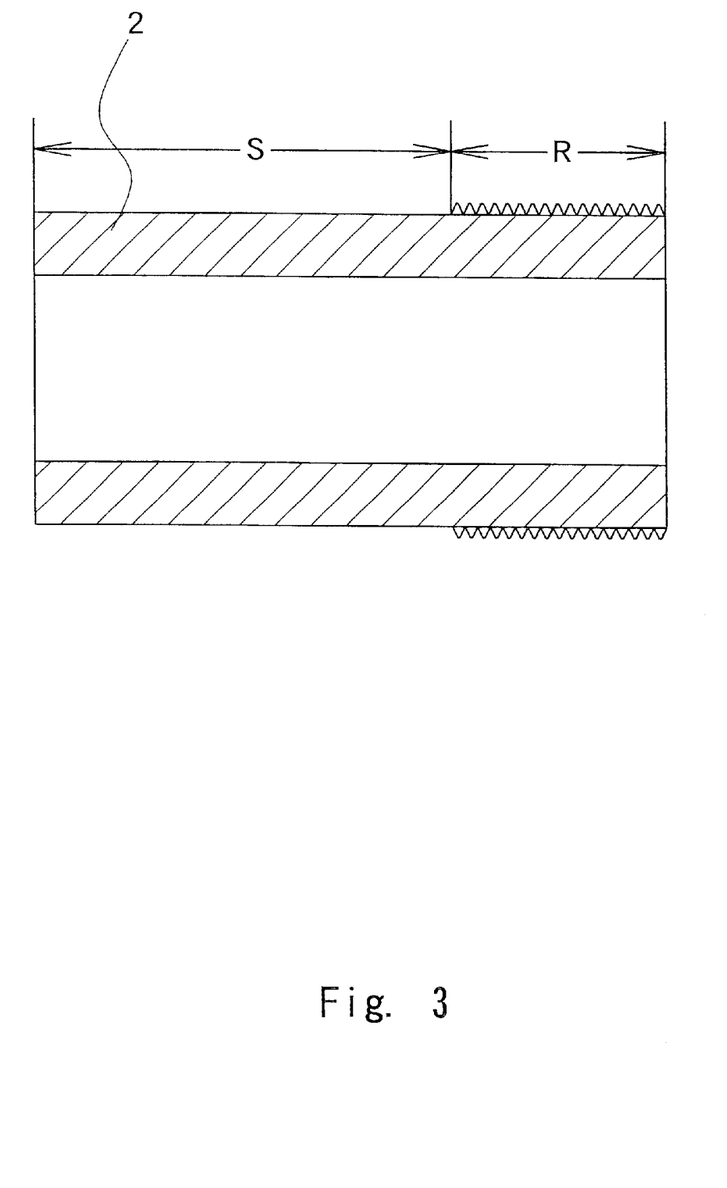
FIG. 3 is a cross-sectional view of a lens barrel constructed in accordance with the present invention, taken along a plane passing through the axis of a cam barrel of the lens barrel.

As shown in FIGS. 1 and 3, the cam barrel 2 is constructed so that a sliding surface section S having a sliding surface finished with higher accuracy is formed over the surface area ranging from the front end to an appropriate position of the outer periphery of the cam barrel 2 and a roughened surface section R finished with roughened accuracy is formed over the other surface area ranging from the sliding surface section S to the rear end thereof. The sliding surface section S and the roughened surface section R are formed by making the moving speed of the associated tool of a lathe or the like different, i.e., low and high, in processing the associated outer periphery of the cam barrel 2, the outer periphery of the cam barrel 2 is subjected to a fine cutting process to have the sliding surface section S and to a rough cutting process to have the roughened surface section R, respectively. Furthermore, the cam barrel 2 may be constructed so that the outer diameter of the sliding surface section S is appropriately made shorter than that of the roughened surface section R to form a slight step therebetween.

Additionally, female screw portions 25 are formed in the front end of the outer periphery of the cam barrel 2 so as to be disposed at four positions of the outer periphery in the circumferential direction thereof while being spaced at equal intervals. Moreover, a hole having an appropriate depth and small diameter is formed at an appropriate position of the outer periphery of the cam barrel 2 to constitute an alignment guide hole 26. Note that although the alignment guide hole 26 can be used as a processing reference point to be referred in processing the cams 21, 22, and 23, the control holes 24, the female screw portions 25 and the like, the processing reference point may additionally be formed independent of the alignment guide hole 26. Likewise, also in the fixed barrel 1 is formed an alignment guide (not shown). Note that as the fixed barrel 1 is made of a synthetic resin, a production mark or the like molded at the time of fabrication can be employed as an alignment guide.

Figure 10:
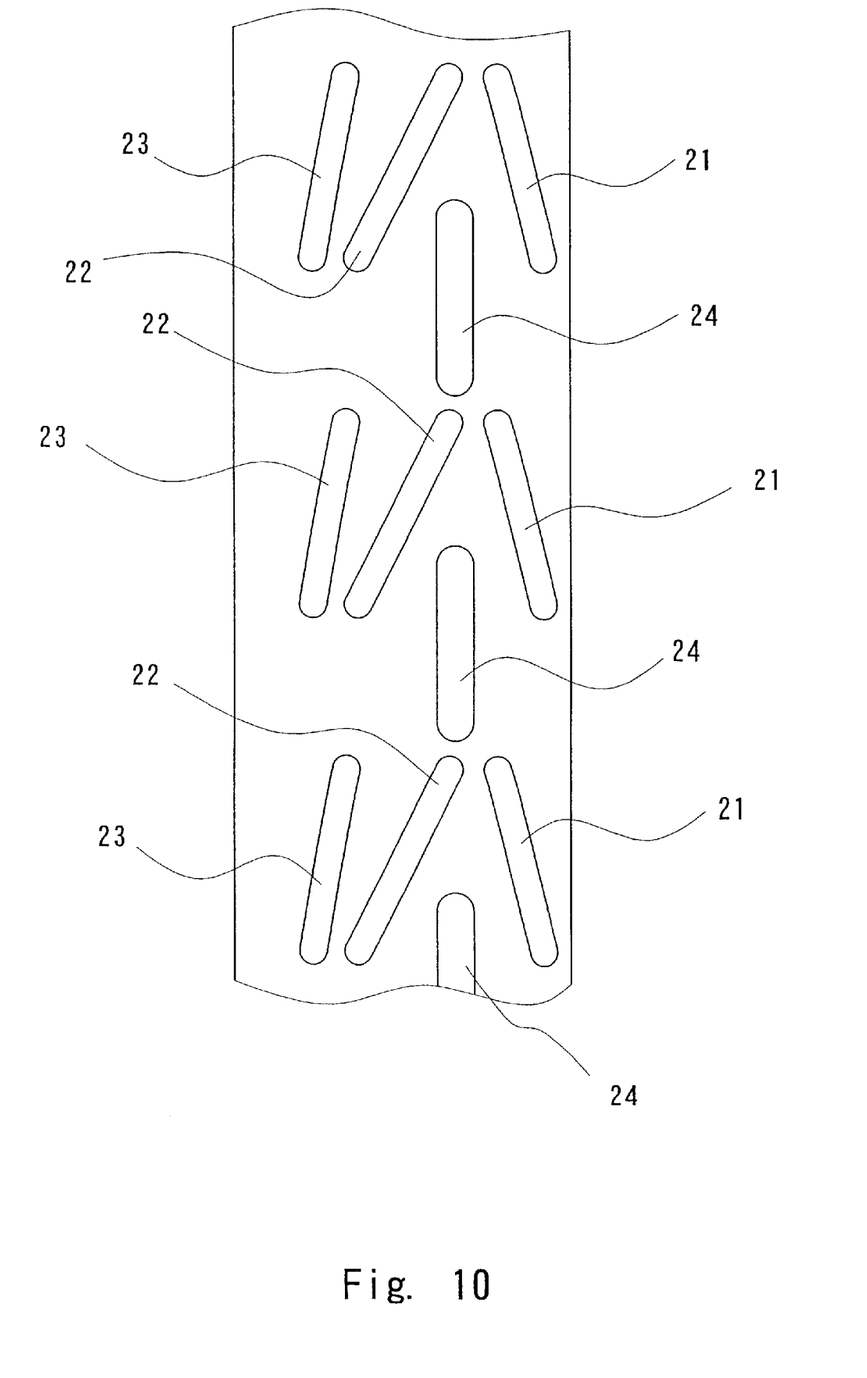
FIG. 10 is an expanded plan view of a cam barrel employed in a lens barrel for use in a zoom lens apparatus in accordance with one embodiment of the present invention.
Figure 11:
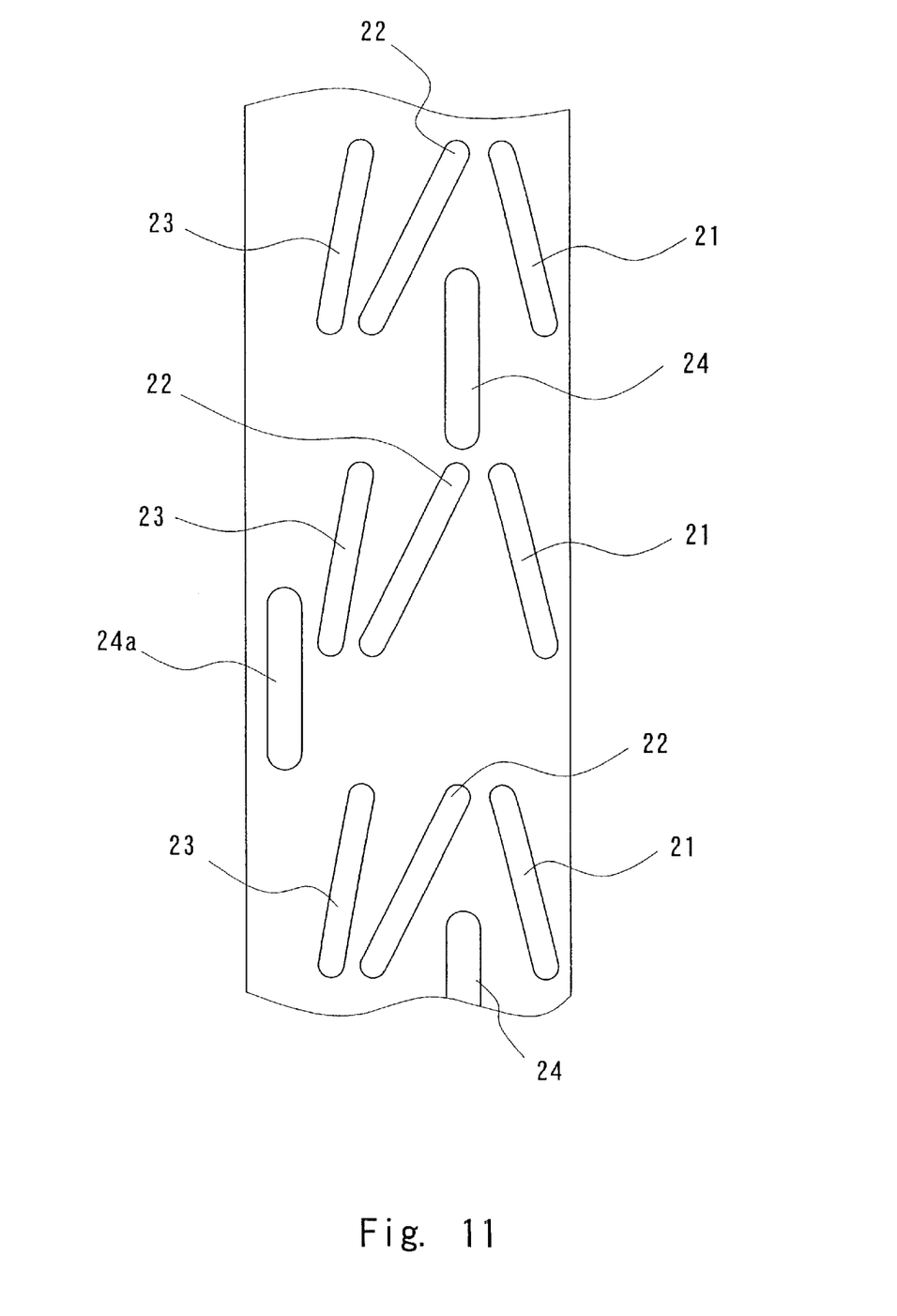
FIG. 11 is an expanded plan view of a cam barrel employed in a lens barrel for use in a zoom lens apparatus in accordance with another embodiment of the present invention.

FIGS. 10 and 11 are expanded plan views of the cam barrel 2 and the control holes 24 may be formed at the positions equivalently located relative to the optical axis direction as shown in FIG. 10, or be formed at the positions differently located relative to the optical axis direction as shown in FIG. 11. For example, in the case where in relation to other parts or the like the construction that the cam barrel 2 has to be freely fitted into the fixed barrel 1 having a predetermined positional relationship with the fixed barrel 1 is employed in the zoom lens apparatus, when the control hole 24a is formed at the position located differently from other control holes with respect to the optical axis direction, a position for the female screw portion 12 to be positioned in correspondence with the control hole 24a is determined, thereby enabling the cam barrel 2 to be positioned at a constant position. In the case where such construction is employed in the zoom lens apparatus, it is unnecessary to form the alignment guide hole 26 in the cam barrel.

Subsequently, control members 6 are provided for penetrating the associated control holes 24 and then threadably engaging with the female screw portions 12. The control member 6 comprises a control pin 61 made of a metal and a sleeve 62 made of a resin, and a male screw portion 61a (refer to FIG. 9) is formed at the distal end of the control pin 61 to threadably engage with the female screw portion 12. The sleeve 62 is positioned within the control hole 24 in a state of the male screw portion 61a and the female screw portion 12 threadably engaging with each other.

Figure 9:
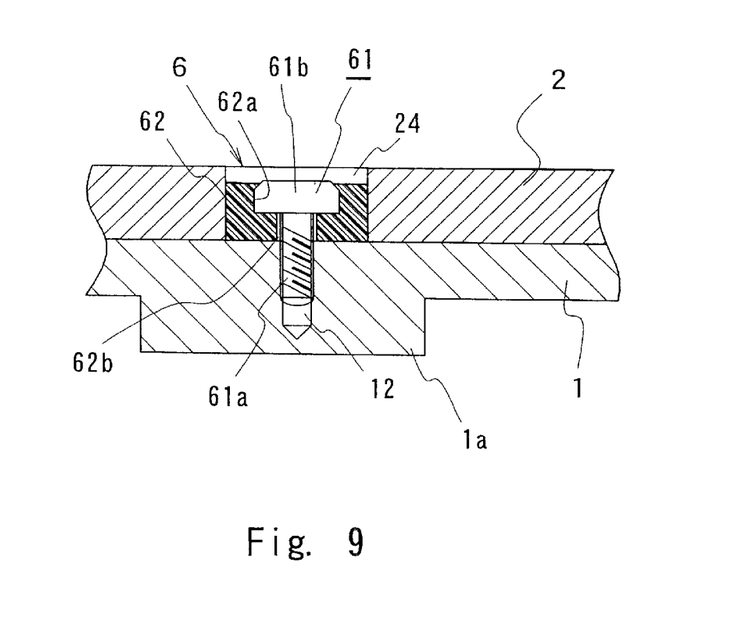
FIG. 9 is a cross-sectional view of the structure shown in FIG. 8, taken along the line A—A, of FIG. 8.

As shown in FIG. 9, the sleeve 62 is an annular sleeve comprising a housing portion 62a for housing a head portion 61b of the control pin 61 and a penetration portion 62b having a diameter shorter than that of the housing portion 62a and allowing the male screw portion 61a to pass therethrough. The sleeve 62 is made of polycarbonate resin, polyacetal resin, fluorocarbon resin, other synthetic resins, or natural resin. Furthermore, the outer diameter of the sleeve 62 is slightly larger than the width of the control hole 24 and the sleeve 62 is squeezed into the control hole 24 such that the two parts tightly contact each other pushing against each other.

As shown in FIG. 1, the zooming ring 3 comprises a support ring portion 31 freely fitted into the cam barrel 2 and an input ring portion 32 having a diameter larger than that of the support ring portion 31. The support ring portion 31 includes screw holes 33 for allowing fixing screws 7 to pass therethrough, the fixing screws threadably engaging with the female screw portions 25 formed in the cam barrel 2. In addition, on the input ring portion 32 includes an operation knob 34 projecting outward therefrom. Therefore, an operator can rotate the zooming ring 3 by holding the operation knob 34.

The focusing ring 4 comprises an attachment ring portion 41 attached to the fixed barrel 1 and an operation ring portion 42 holding the focus lens system 4a and operated by an operator. At an appropriate position of the attachment ring portion 41 is formed a female screw portion 43 for allowing a control screw 8 to threadably engage with the female screw portion. Furthermore, a female helicoid (not shown) is formed in the inner periphery of the attachment ring portion 41 over the inner peripheral area ranging from the rear end to an appropriate position thereof. The female helicoid threadably engages with the male helicoid 15 formed at the front end of the fixed barrel 1. Additionally, in a state of the female helicoid and the male helicoid threadably being engaged with each other, the female screw portion 43 is to be positioned in correspondence with the guide groove 14 of the fixed barrel 1.

Operational advantages achieved by the above-constructed lens barrel for use in the zoom lens apparatus employed in the embodiment in accordance with the present invention will be explained below.

The cam barrel 2 is freely fitted to the fixed barrel 1 in a state of the prescribed lens groups 2a, 2b, and 2c being housed inside the fixed barrel 1 and then, the holding screws 9a, 9b, and 9c penetrating the cams 21, 22, and 23 and the guide holes 11 are tightened up into the lens mounts 2d, 2e, and 2f which hold the associated lens groups 2a, 2b, and 2c, thereby allowing the lens groups to be connected with the associated cams 21, 22, and 23, respectively.

When the cam barrel 2 is to be freely fitted to the fixed barrel 1, the alignment guide hole 26 is made to be positioned at a predetermined position with respect to the alignment guide (not shown) formed in the fixed barrel 1. Thus, the cam barrel 2 is freely fitted to the fixed barrel 1 having a predetermined positional relationship therewith.

Furthermore, the control holes 24 are positioned in correspondence with the female screw portions 12 of the fixed barrel 1 and then the control members 6, each being previously assembled by inserting the control pin 61 into the sleeve 62, are made to penetrate the associated control holes 24, and thereafter, each of the male screw portions 61a thereof is made to threadably and tightly engage with the associated female screw portion 12. In this case, when the sleeve 62 is positioned within the control hole 24, the state of the head portion 61b of the control pin 61 being housed in the housing portion 62a of the sleeve 62 is realized. Therefore, the control member 6 becomes completely embedded within the control hole 24 so as not to project from the outer periphery of the cam barrel 2.

Subsequently, the zooming ring 3 is made to fit onto the cam barrel 2 from the side of the front end thereof. In this case, as shown in FIG. 4(a), the operation for moving the zooming ring 3 to the central portion of the cam barrel 2 can be smoothly performed since the sliding surface section S is formed over the surface area ranging from the front end to the central portion of the outer periphery of the cam barrel 2. In addition, when the zooming ring 3 reaches the roughened surface section R, the zooming ring 3 cannot move smoothly anymore, whereby desired operation for moving the zooming ring 3 to the desired position of cam barrel 2 can be realized. In this state, as shown in FIG. 4(a), the front end of the fixed barrel 1 is being exposed.

In a state of the zooming ring 3 being fitted to the central portion of the cam barrel 2, the focusing ring 4 is attached to the front end of the fixed barrel 1. The attachment of the focusing ring 4 is performed such that the female helicoid at the rear end of the focusing ring 4 is threadably engaged with the male helicoid 15 at the front end of the fixed barrel 1. In a state of the above-described two helicoids being threadably engaged with each other over an appropriate distance in the optical axis direction, the female screw portion 43 of the focusing ring 4 is positioned in correspondence with the guide groove 14 of the fixed barrel 1. Then, the control screw 8 is tightened up into the female screw portion 43 to make the distal end thereof positioned within the guide groove 14 and thereafter, in the event the focusing ring 4 is made to rotate, as the distal end of the control screw 8 comes into contact with the end surfaces of the guide groove 14, the range of rotational movement of the focusing ring 4 is limited. In addition, as the male helicoid 15 and the female helicoid are threadably engaged with each other, when the focusing ring 4 moves forward and backward in the optical axis direction by its rotational movement, the focus lens system 4a held by the focusing ring 4 also moves forward and backward in the same direction to thereby perform focusing.

Figure 2:
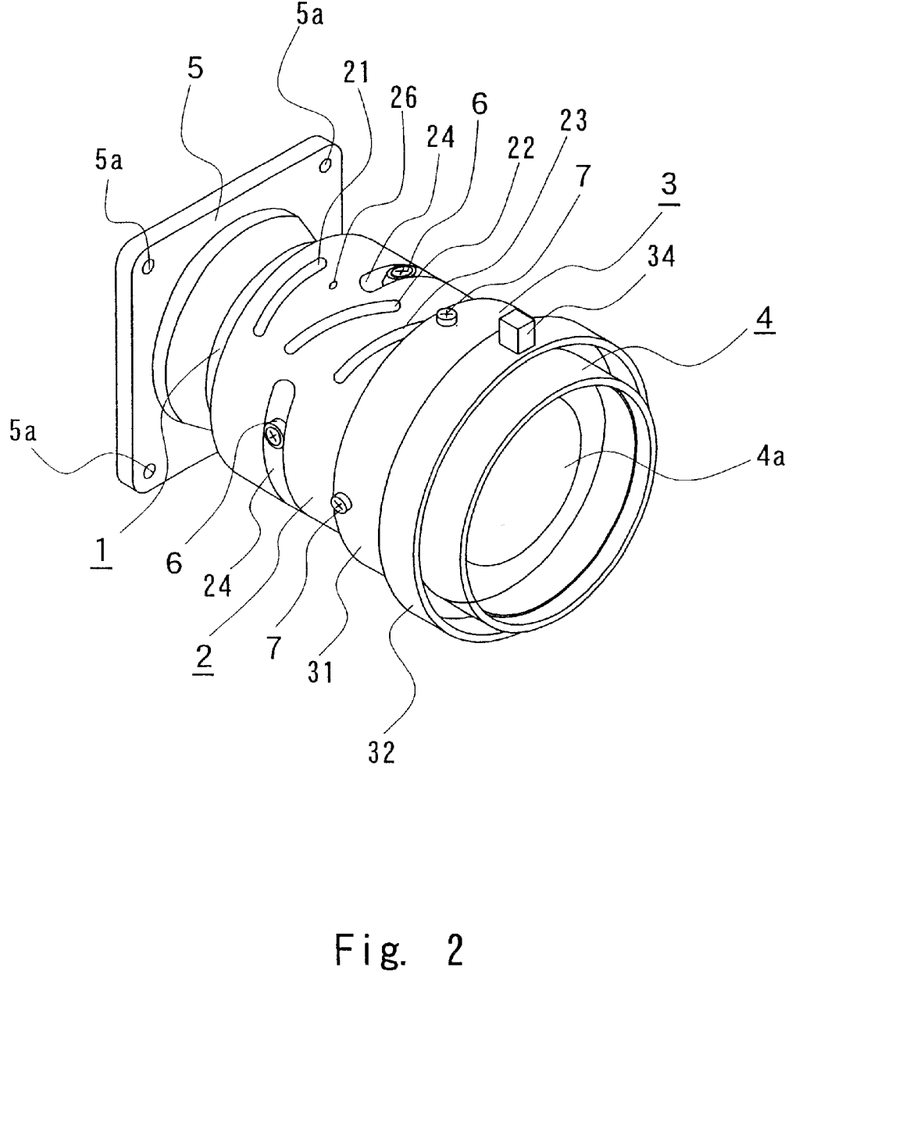
FIG. 2 is a perspective view of a lens barrel constructed in accordance with the present invention.

In a state of the focusing ring 4 being attached to the fixed barrel 1, as shown in FIG. 4(b), the zooming ring 3 fitted into the cam barrel 2 is made to move to the front end of the cam barrel 2, thereby positioning the screw hole 33 of the support ring portion 31 in correspondence with the female screw portion 25 of the cam barrel 2. Note that as the zooming ring 3 moves on the sliding surface section S, the zooming ring can smoothly be moved to the front end of the cam barrel 2. Thereafter, the fixing screw 7 is made to penetrate the screw hole 33 to threadably and tightly engage with the female screw portion 25, thereby attaching and then fixing the zooming ring 3 to the cam barrel 2. Thus, the operation for assembling the zoom lens barrel shown in FIG. 2 is completed.

Thereafter, the zoom lens barrel constructed by attaching the cam barrel 2, the zooming ring 3, and the focusing ring 4 to the fixed barrel 1 is attached to the main body of the zoom lens apparatus. The operation for attaching the zoom lens barrel thereto is performed so that fixing screws (not shown) are made to penetrate the through-holes 5a of the base block 5 located at the base portion of the fixed barrel 1 and then are tightened up into the main body of the zoom lens apparatus.

In the zoom lens barrel assembled as described above, when the cam barrel 2 is rotated relative to the fixed barrel 1, the lens groups are limited in their moving distance by the associated cams 21, 22, and 23 connected correspondingly therewith and move forward and backward in the optical axis direction guided by the guide holes 11 while keeping their predetermined optical performances, thereby performing zooming. The rotation of the cam barrel 2 is performed by rotating the zooming ring 3 fixed to the cam barrel 2 and the rotation of the zooming ring 3 is performed by rotating the operation knob 34 mounted on the zooming ring 3. In addition, as the cam barrel 2 is only in contact with the distal end surfaces of the supporting projections 13 formed on the fixed barrel 1, the contact area therebetween is small and therefore, the cam barrel can smoothly be rotated.

The control members 6 are inserted into the associated control holes 24, and therefore, the cam barrel 2 rotates guided by the control members 6, and further, is limited in its rotational distance in such a manner that the respective ends of each of the control holes 24 come into contact with the associated control member 6 in response to the rotational movement of the cam barrel 2. Accordingly, the zoom lens apparatus is able to perform zooming within a reliable zooming range that secures its optical performances. In addition, as the sleeve 62 of the control member 6 is tightly in contact with the inner periphery of the control hole 24, the sleeve 62 and the control hole 24 have no allowance therebetween, thereby preventing the cam barrel 2 from moving even a slight distance in the optical axis direction. Furthermore, as the sleeve 62 is made of a resin, the frictional resistance between the sleeve 62 and the inner periphery of the control hole 24 is reduced, whereby the cam barrel 2 is free from the troubles in its rotational movement and can smoothly be rotated.

Additionally, as the set of the control member 6 and the control hole 24 is provided in three portions of the cam barrel 2, which portions are determined so as to divide the cam barrel equally among three in the circumferential direction thereof, even in the case where the allowance between the fixed barrel 1 and the cam barrel 2 exists, the oscillation of the cam barrel 2 in the direction perpendicular to the optical axis direction can be prevented. That is, even when the cam barrel happens to be oscillated around one of the control members 6 as an axis, the oscillation is prevented by the engaging force generated between the other set of the control member 6 and the control hole 24.

In a state of the desired magnification being achieved by performing zooming, the focusing ring 4 is rotated to perform focusing. When the focusing ring 4 is rotated, as the focusing ring 4 and the fixed barrel 1 are engaged with each other via the helicoids formed respectively therein, the focusing ring 4 moves forward and backward in the optical axis direction with respect to the fixed barrel 1 followed by the forward and backward movement of the focus lens system 4a in the same direction. Thus, the forward and backward movement of the focus lens system 4a performs focusing.

It should be noted that as described above, since an approximately upper half of the projection lens is used in the zoom lens apparatus, the projection lens has to be adjusted such that the portion of the projection lens through which the clearest projected images are obtained is positioned in the upper half of the projection lens by rotating the projection lens around the optical axis. The adjustment of the projection lens is performed by varying the position for the fixed barrel 1 to be attached to the main body of the zoom lens apparatus. That is, as the fixed barrel 1 is attached to the main body of the zoom lens apparatus via the fixing screws penetrating the through-holes 5a of the base block 5, the fixed barrel 1 can be attached to the main body keeping any one of the positions with respect to the main body, which positions can be varied by rotating the fixed barrel 1 in increments of 90 degrees. That is, by rotating the fixed barrel 1 in increments of 90 degrees to vary the position thereof to be attached to the main body of the lens apparatus, the projection lens is adjusted to be positioned for the zoom lens apparatus to be able to project clear images.

Figure 5:
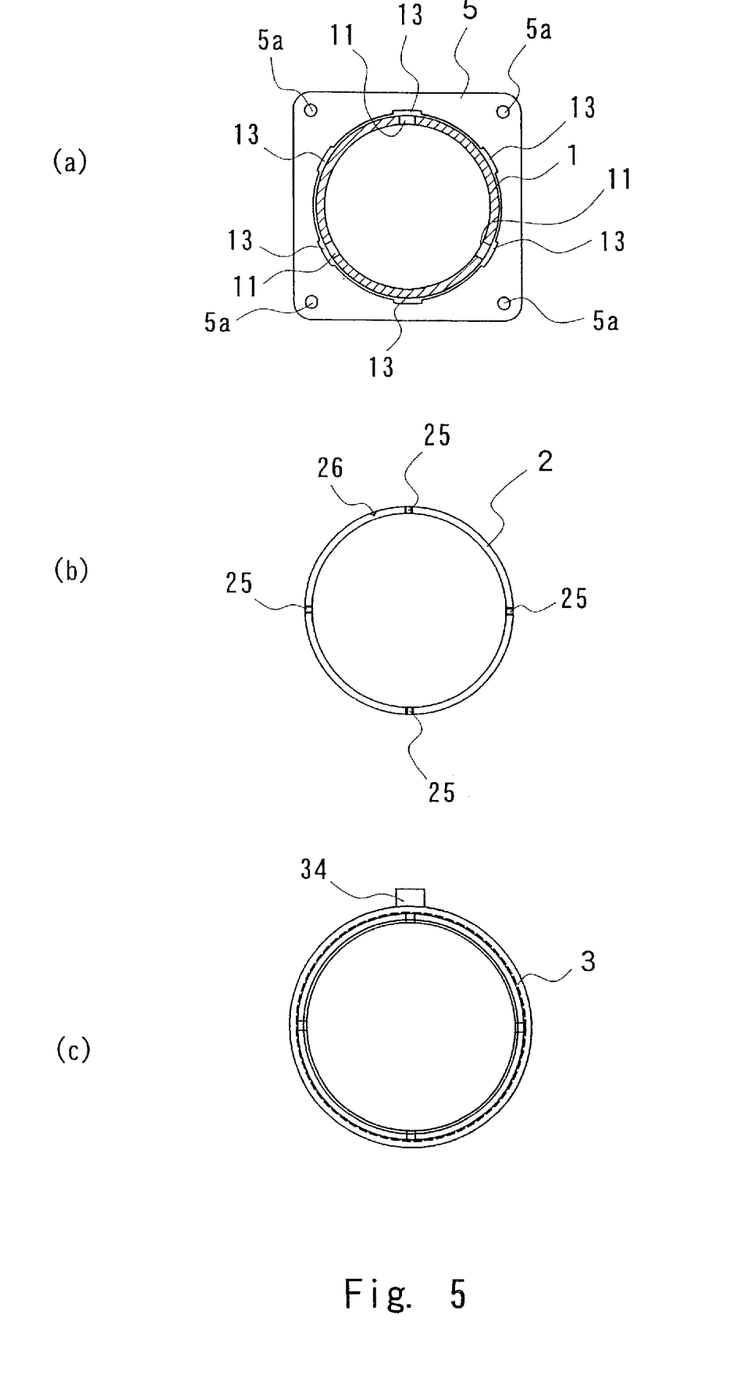
FIG. 5 is an explanatory view of a lens barrel for use in a zoom lens apparatus in accordance with the present invention, illustrating correct positional relationship between a fixed barrel, a cam barrel, and an input member, including FIGS. 5(a), 5(b), and 5(c) being front views of the fixed barrel, the cam barrel and the input member respectively.
Figure 6:
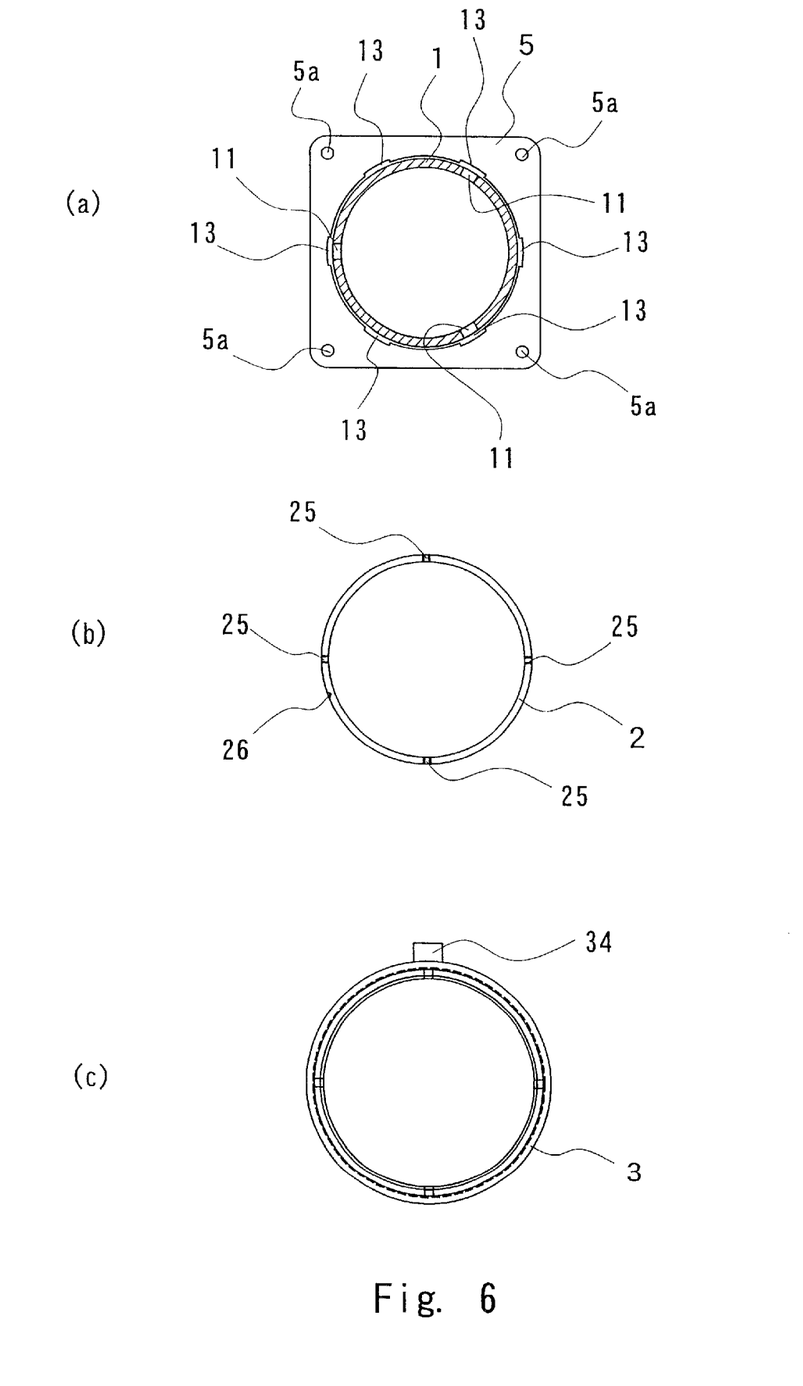
FIG. 6 is an explanatory view of a lens barrel for use in a zoom lens apparatus in accordance with the present invention, illustrating the positional relationship between a fixed barrel, a cam barrel, and an input member in the case where the fixed barrel is made to rotate by 90 degrees in a state of those three members being assembled at their correct positions, including FIGS. 6(a), 6(b), and 6(c) being front views of the fixed barrel, the cam barrel, and the input member, respectively.

Relationship between the operation for adjusting the position of the fixed barrel 1 to be attached to the main body and the position of the cam barrel 2 will be explained with reference to FIGS. 5 through 7. In the embodiment, the through-holes 5a used for fixing the fixed barrel 1 are formed at four corners of approximately square base block 5, and the guide holes 11 formed in the fixed barrel 1 and the cams 21, 22, and 23 formed in the cam barrel 2 are located at the associated three peripheral positions of the fixed barrel 1 and the cam barrel 2 while being spaced at equal intervals, and further, the female screw portions 25 used for fixing the zooming ring 3 to the cam barrel 2 are provided at four peripheral positions of the cam barrel 2 while being spaced at equal intervals. FIG. 5 illustrates the cam barrel 2 being attached to the fixed barrel 1 at its correct position with respect to the fixed barrel 1 and as shown in FIG. 5(a), the through-holes 5a of the base block 5 are located at the positions thereof at angles of approximately 45 degrees with respect to the vertical line passing through the center of the fixed barrel 1. In this state, the alignment guide hole 26 is located, for example, at the upper portion of the cam barrel 2 and as shown in FIG. 5(b), the female screw portions 25 are located on the vertical and horizontal lines, both of which pass through the center of the fixed barrel 1, at angles of approximately 45 degrees with respect to the through-holes 5a of the base block 5. In addition, in a state of the cam barrel 2 being positioned at the above-described position, assume that as shown in FIG. 5(c), the zooming ring 3 is attached so as to make the operation knob 34 positioned at the uppermost position thereof and, at the same time, is required to be positioned at the above-stated position.

Based on the state of the fixed barrel 1 being attached as shown in FIG. 5(a), assume that the following requirement occurs. That is, in order to adjust the projected images, the fixed barrel 1 is made to rotate by 90 degrees in the counterclockwise direction with respect to the position thereof indicated in FIG. 5(a) to vary its position to be attached. The resulting positional state of the fixed barrel 1 is indicated in FIG. 6. As shown in FIG. 6, as the positional state of the through-holes 5a of the base block 5 is similar to that indicated in the case of FIG. 5(a), the fixed barrel 1 can be attached to the main body of the zoom lens apparatus. In addition, as shown in FIG. 6(b), the female screw portions 25 of the cam barrel 2 are being positioned at the positions rotated by 90 degrees with respect to the positions shown in FIG. 5(b) and are still similar to the positional state of the female screw portions shown in FIG. 5(b). Therefore, as shown in FIG. 6(c), the zooming ring 3 can be attached to the cam barrel 2 so as to make the operation knob 34 thereof positioned at the uppermost position thereof. Accordingly, the operation knob 34 can be positioned at its required position. Note that, even in the case where the fixed barrel is made to further rotate in increments of 90 degrees in the counterclockwise direction with respect to the positional state shown in FIG. 6, the zooming ring 3 can similarly be attached to the cam barrel 2 so as to make the operation knob 34 thereof positioned at the uppermost position thereof.

Figure 7:
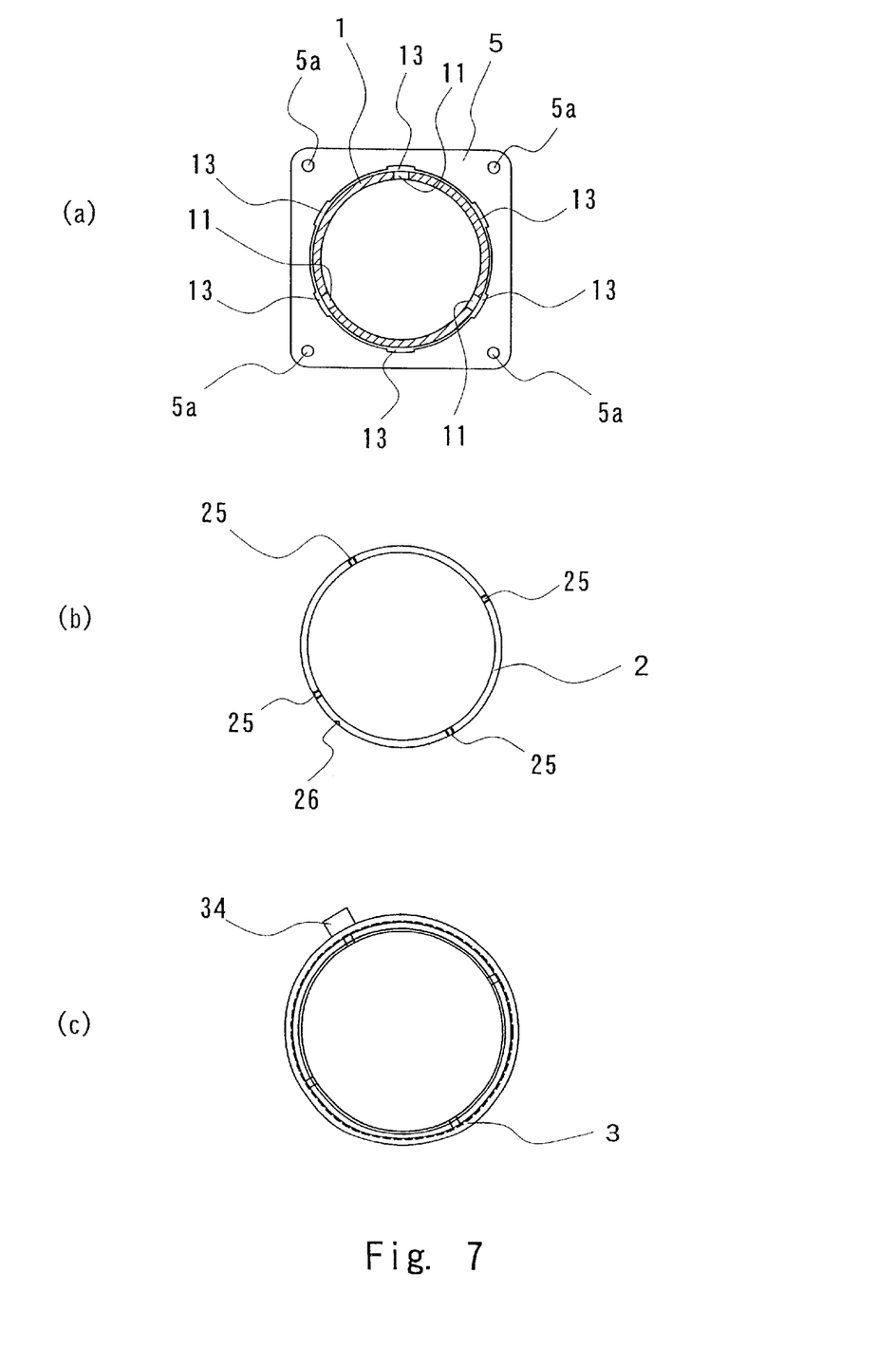
FIG. 7 is an explanatory view of a lens barrel for use in a zoom lens apparatus in accordance with the present invention, illustrating positional relationship between a fixed barrel, a cam barrel, and an input member in a state of those three members being wrongly assembled to have incorrect positional relationship therebetween, including FIGS. 7(a), 7(b), and 7(c) being front views of the fixed barrel, the cam barrel, and the input member, respectively.
Figure 8:
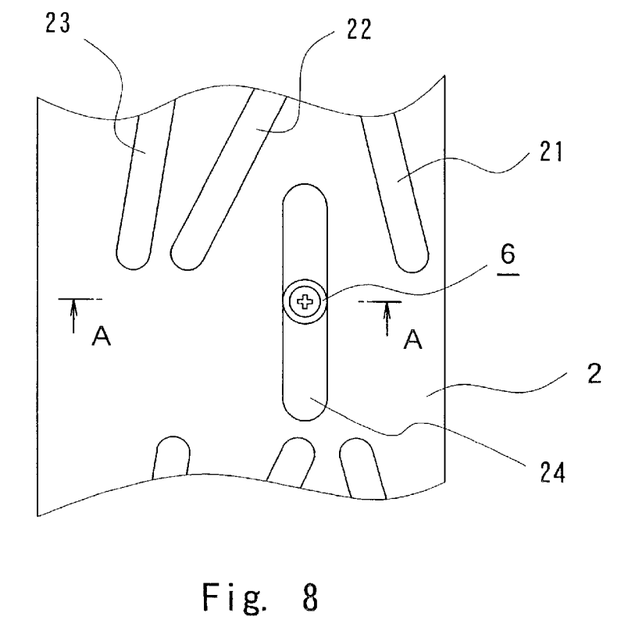
FIG. 8 is a plan view of a cam barrel employed in a lens barrel for use in a zoom lens apparatus in accordance with the present invention, illustrating a structure of the cam barrel employed for limiting the range of rotational movement of the cam barrel.

On the other hand, the case where the cam barrel 2 is attached to the fixed barrel 1 in a wrongly positioned state with respect thereto is illustrated in FIG. 7. As the fixed barrel 1 and the cam barrel 2 are connected with each other via three pairs of one of the guide holes 11 and one set of the cams 21, 22, and 23, in the event the cam barrel 2 is attached in a wrongly positioned state, as shown in FIG. 7(b), the alignment guide hole 26 is positioned at the position rotated by 120 degrees with respect to its correct position. Therefore, as shown in FIG. 7(b), the female screw portions 25 formed in the cam barrel 2 are positioned at the positions distorted by approximately 30 degrees with respect to the vertical and horizontal directions. Accordingly, when the zooming ring 3 is attached to the cam barrel 2, as shown in FIG. 7(c), the operation knob 34 is positioned at the position distorted by approximately 30 degrees with respect to the vertical direction, thereby being positioned at the position different from the required position. In addition, even when the fixed barrel 1 is made to rotate in increments of 90 degrees, the operation knob 34 cannot be positioned at the uppermost position of the zooming ring 3.

That is, the operation for attaching the cam barrel 2 to the fixed barrel 1 so as to make the alignment guide hole 26 positioned at the predetermined position with respect to the alignment guide of the fixed barrel 1 makes it possible that even in the event the fixed barrel 1 is made to rotate for the purpose of improving projected images, the operation knob 34 is positioned at its required position.

Incidentally, for instance, assume that even in the case where the base block 5 is formed as an equilateral hexagon and the through-holes 5a are correspondingly formed at corners of the equilateral hexagon, permitting the fixed barrel to rotate degrees in multiples of 60 degrees, the fixed barrel having such construction can be attached to the main body of the zoom lens apparatus. In addition, in the case where the construction that the female screw portions 25 are formed at six corners of the cam barrel 2 while being spaced at equal intervals is added to the above-described case, even when the cam barrel 2 is attached to the fixed barrel 1 keeping any one of its six positions thereof, the operation knob 34 can be positioned at its required position. That is, the reason is as follows: the above-described construction has "3" as a greatest common divisor of the number of the female screw portions 25 and the number of sets of cam holes, which construction is different from that of the case of FIGS. 5 through 7 having "1" as a greatest common divisor; and therefore, even when the cam barrel 2 is attached distorted from its correct position, the female screw portions 25 can maintain their correct positional relationship with the zooming ring. Accordingly, in such construction of the lens barrel, it is unnecessary to form the alignment guide hole 26 in the cam barrel.

As described above so far, the lens barrel of the zoom lens apparatus in accordance with the present invention comprises a fixed barrel holding a zoom lens system, and a cam barrel freely fitted into the fixed barrel and made to rotate around the optical axis direction as an axis with respect to the fixed barrel to thereby move the lens system in the optical axis direction, in which an appropriate number of radial supporting projections constituting a part of an outer periphery of the fixed barrel and projecting an appropriate length in both the circumferential direction thereof and the optical axis direction are provided on portions of the fixed barrel, the portions being located in correspondence with the ends of the cam barrel so as to face the associated ends of the cam barrel, and the cam barrel is supported by the supporting projections. Thus, the cam barrel can be supported in a small area to the utmost to thereby enable smooth rotation with respect to the fixed barrel. Furthermore, even when thermal deformation could occur in the fixed barrel, as the cam barrel is in contact with the supporting projections in a small area, the influence of the deformation can be suppressed to the minimum extent and therefore, the cam barrel can maintain its smooth rotation to the utmost.

Additionally, as the supporting projections are provided on respective ends of the fixed barrel and spaced at equal intervals, and further, the supporting projections on the respective ends of the fixed barrel are provided facing each other, when the fixed barrel is formed by fabrication using a synthetic resin, the die assembly used for molding of the fixed barrel can be formed of a simplified structure.

Furthermore, as the supporting projections are provided on the associated ends of the fixed barrel and spaced at equal intervals, and further, the supporting projections are alternately disposed at front and rear ends of the fixed barrel in the circumferential direction thereof, the cam barrel is equally supported by the supporting projections to thereby enable smoother rotation. In addition, in the event thermal deformation occurs in the fixed barrel, the deformation is equally absorbed by the projections to thereby enable the cam barrel to keep its smooth rotational movement to the utmost.

Moreover, the zoom lens apparatus comprises a fixed barrel holding a zoom lens system and further a focus lens system at a front end thereof, a cam barrel freely fitted into the fixed barrel and rotating around the optical axis direction as an axis with respect to the fixed barrel to move the zoom lens system in the optical axis direction, and an input member fixed to the cam barrel to rotate the cam barrel, in which a control section for restricting movement of the input member in the optical axis direction to thereby limit the degree of longitudinal engagement of the input member with the cam barrel is formed on the outer periphery of the cam barrel. Therefore, when other parts are going to be assembled in a state of the input member being temporarily mounted on the cam barrel, the input member can easily be moved outside the area that will be occupied by the other parts, thereby allowing assembling operation to be smooth.

Additionally, when the outer periphery of the cam barrel is processed, the moving speed of the processing tool is made different. That is, the moving speed thereof is made low to process one area of the outer periphery of the cam barrel ranging from the front end to the appropriate position of the cam barrel with high accuracy and the moving speed is made high to process the other area of the outer periphery, thereby forming the surface areas to have different processing accuracies on the outer periphery. As a boundary between the surface areas having different processing accuracies serves as the control section, the surface area to be processed with high accuracy can easily be formed on the outer periphery of the cam barrel.

Furthermore, the outer diameter of the cam barrel is made different at the boundary between the surface areas having different processing accuracies to prevent the input member from moving beyond the surface area processed with high accuracy, thereby enabling to securely limit the movement of the input member within the surface area processed with high accuracy followed by easiness of operation for assembling the input member and other parts.

Moreover, as the fixed barrel is formed by molding using a synthetic resin and the cam barrel is formed by molding using a metal, the manufacturing cost of lens barrel can be reduced, enabling a zoom lens apparatus to be provided at a low price.

While there has been described what are at present considered to be preferred embodiments of the invention, it will be understood that various modifications may be made thereto, and it is intended that the appended claims cover all such modifications as fall within the true spirit and scope of the invention.

The invention claimed is:

1. A lens barrel for use in a zoom lens apparatus, comprising:
   a fixed barrel holding a zoom lens system; and
   a cam barrel freely fitted to said fixed barrel and made to rotate around an optical axis direction with respect to said fixed barrel to move said zoom lens system in said optical axis direction,
   wherein said fixed barrel being further constructed such that a predetermined number of radial supporting projections constituting a part of an outer periphery of said fixed barrel and projecting a predetermined length in both a circumferential direction of said fixed barrel and said optical axis direction are provided on portions of said fixed barrel, said portions being located in correspondence with ends of said cam barrel while facing said associated ends thereof, and
   wherein said cam barrel is supported by said supporting projections.

2. The lens barrel for use in a zoom lens apparatus according to claim 1, wherein said supporting projections are provided on respective ends of said fixed barrel and spaced at equal intervals, and said supporting projections on said respective ends of the fixed barrel are provided facing each other.

3. The lens barrel for use in a zoom lens apparatus according to claim 1, wherein said supporting projections are provided on respective ends of said fixed barrel and spaced at equal intervals, and said supporting projections on said respective ends of the fixed barrel are alternately disposed at front and rear ends of said fixed barrel in said circumferential direction thereof.

4. The lens barrel for use in a zoom lens apparatus according to claim 1, wherein said fixed barrel is formed by molding using a synthetic resin and said cam barrel is formed by molding using a metal.

5. The lens barrel for use in a zoom lens apparatus according to claim 2, wherein said fixed barrel is formed by molding using a synthetic resin and said cam barrel is formed by molding using a metal.

6. The lens barrel for use in a zoom lens apparatus according to claim 3, wherein said fixed barrel is formed by molding using a synthetic resin and said cam barrel is formed by molding using a metal.

7. A lens barrel for use in a zoom lens apparatus, comprising:
   a fixed barrel holding a zoom lens system and at the same time, a focus lens system in a front end thereof;

a cam barrel freely fitted to said fixed barrel and rotating around an optical axis direction as an axis with respect to said fixed barrel to move said zoom lens system in said optical axis direction; and an input member fixed to said cam barrel to rotate said cam barrel, wherein said cam barrel comprising a control section formed on an outer periphery of said cam barrel for restricting movement of said input member in said optical axis direction to thereby limit the degree of longitudinal engagement of said input member with said cam barrel.

8. The lens barrel for use in a zoom lens apparatus according to claim 7, wherein a moving speed of the processing tool is made different when said outer periphery of said cam barrel is processed in such a manner that said moving speed thereof is made low to process one area of said outer periphery of said cam barrel ranging from a front end to an appropriate position of said cam barrel with high accuracy and said moving speed is made high to process the other area of said outer periphery of said cam barrel, whereby surface areas having different processing accuracies are formed on said outer periphery of said cam barrel and a boundary between said surface areas having different processing accuracies constitutes said control section.

9. The lens barrel for use in a zoom lens apparatus according to claim 8, wherein an outer diameter of said cam barrel is made different at said boundary between said surface areas having different processing accuracies to prevent said input member from moving beyond a high accuracy area out of said surface areas, said high accuracy area being processed with high accuracy.

10. The lens barrel for use in a zoom lens apparatus according to claim 7, wherein said fixed barrel is formed by molding using a synthetic resin and said cam barrel is formed by molding using a metal.

11. The lens barrel for use in a zoom lens apparatus according to claim 10, wherein said fixed barrel is formed by molding using a synthetic resin and said cam barrel is formed by molding using a metal.

12. The lens barrel for use in a zoom lens apparatus according to claim 7, wherein said fixed barrel is formed by molding using a synthetic resin and said cam barrel is formed by molding using a metal.

13. The lens barrel for use in a zoom lens apparatus according to claim 8, wherein said fixed barrel is formed by molding using a synthetic resin and said cam barrel is formed by molding using a metal.

14. The lens barrel for use in a zoom lens apparatus according to claim 9, wherein said fixed barrel is formed by molding using a synthetic resin and said cam barrel is formed by molding using a metal.

\* \* \* \* \*